July 30, 1940.                B. LASSMAN                2,209,404
         APPARATUS FOR THE MANUFACTURE OF HOLLOW
           AND INDENTED DRY PRESSED CERAMIC WARE
                   Filed July 6, 1937          4 Sheets-Sheet 1

INVENTOR
Benjamin Lassman

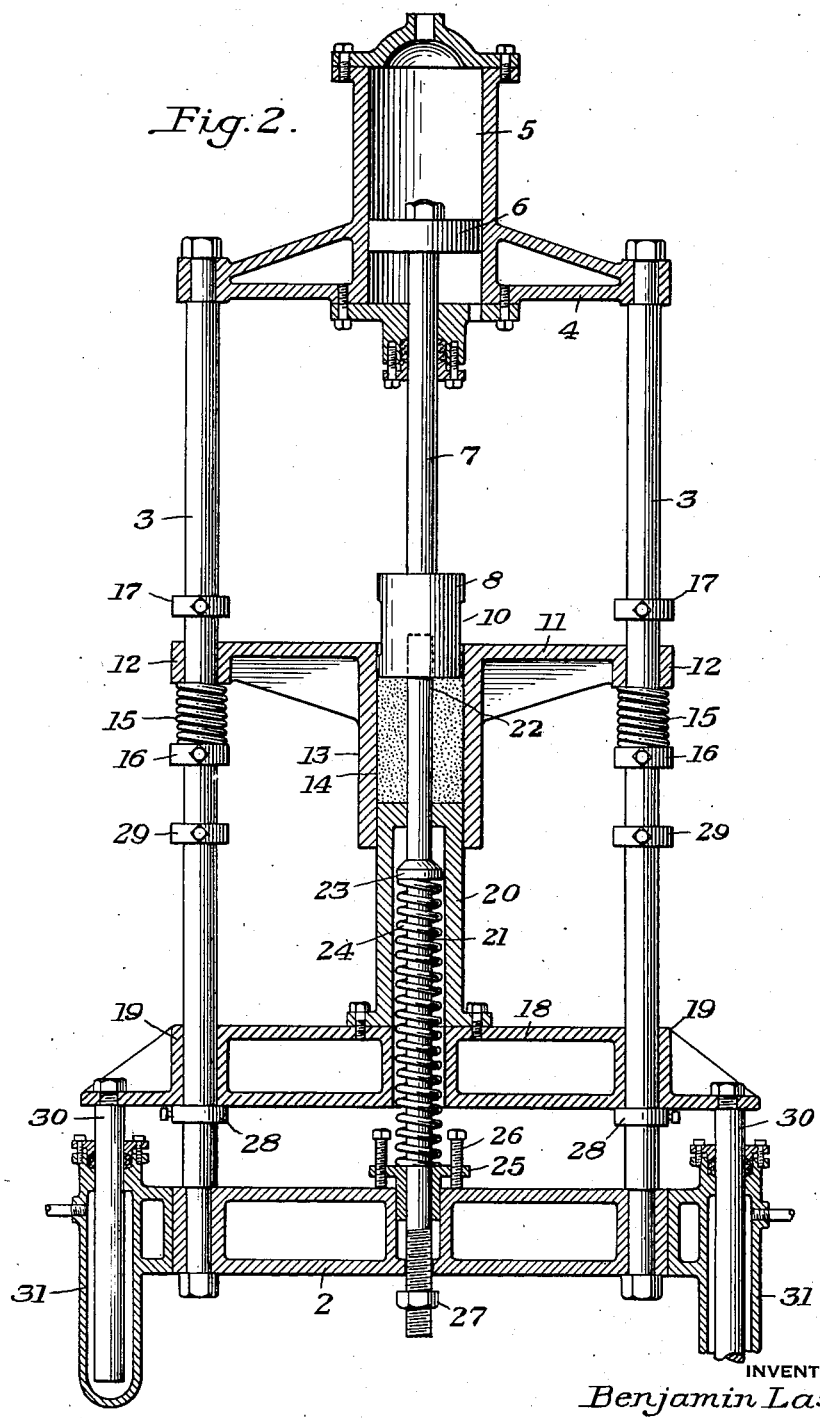

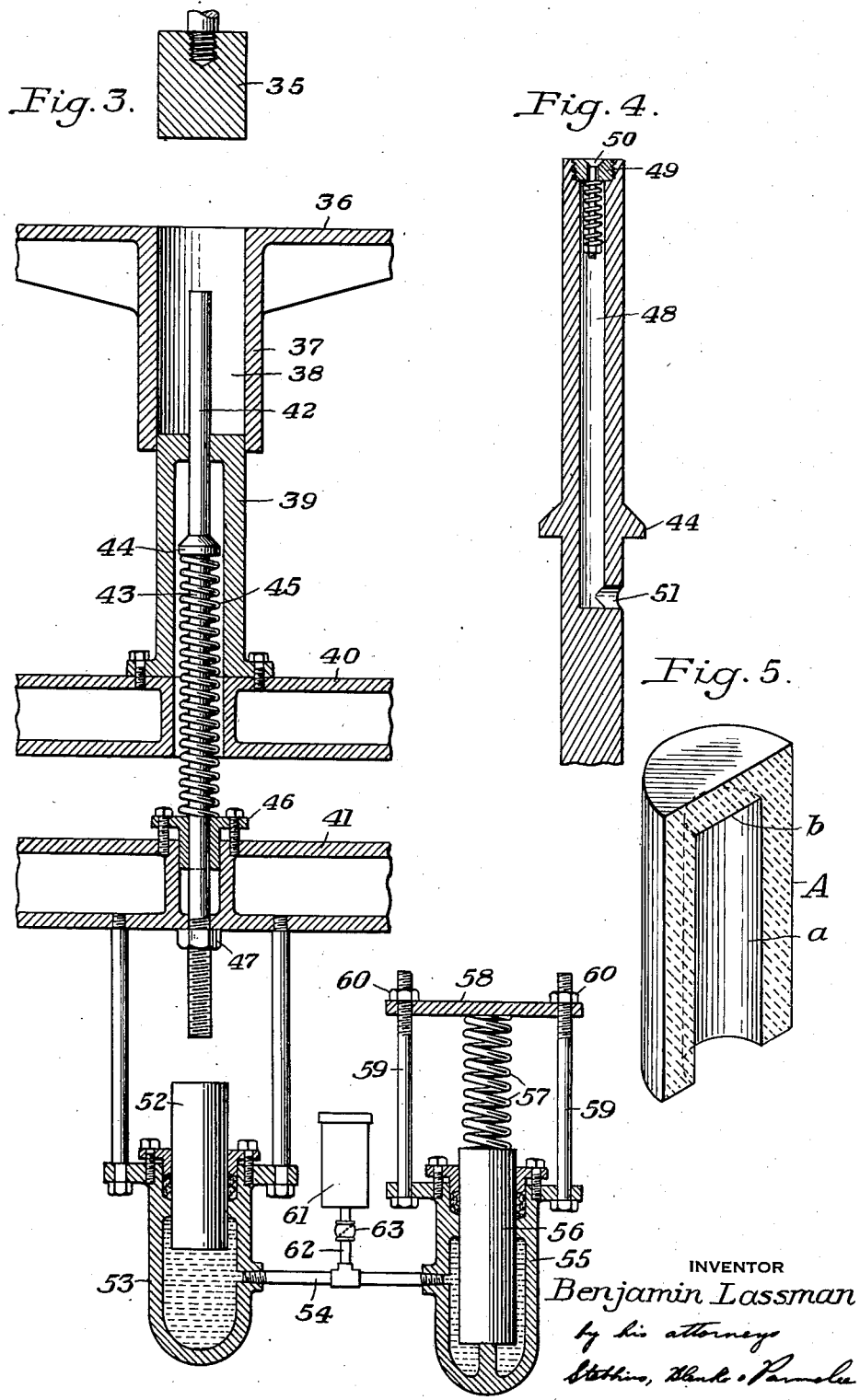

July 30, 1940.  B. LASSMAN  2,209,404
APPARATUS FOR THE MANUFACTURE OF HOLLOW
AND INDENTED DRY PRESSED CERAMIC WARE
Filed July 6, 1937 4 Sheets-Sheet 4
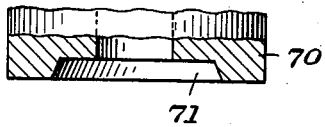
Fig. 6.
Fig. 7.
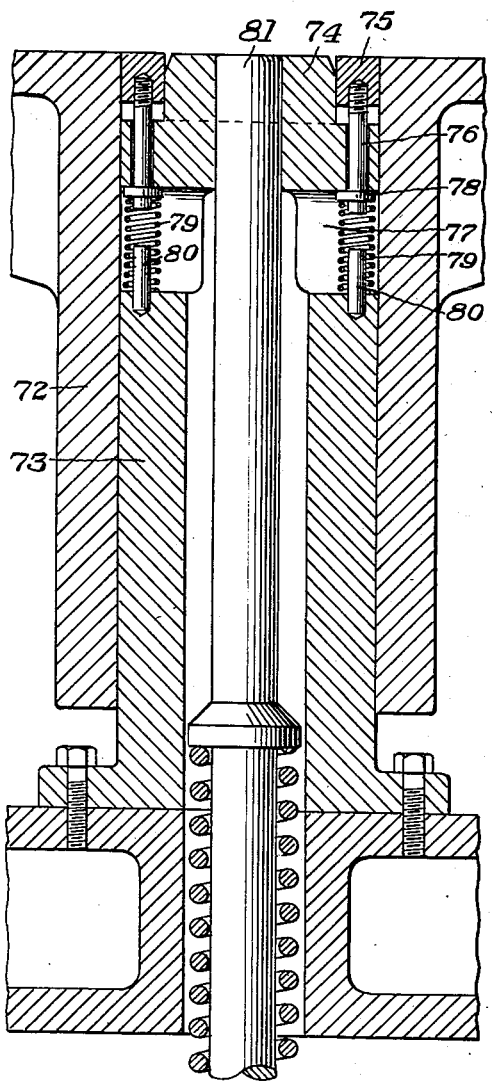
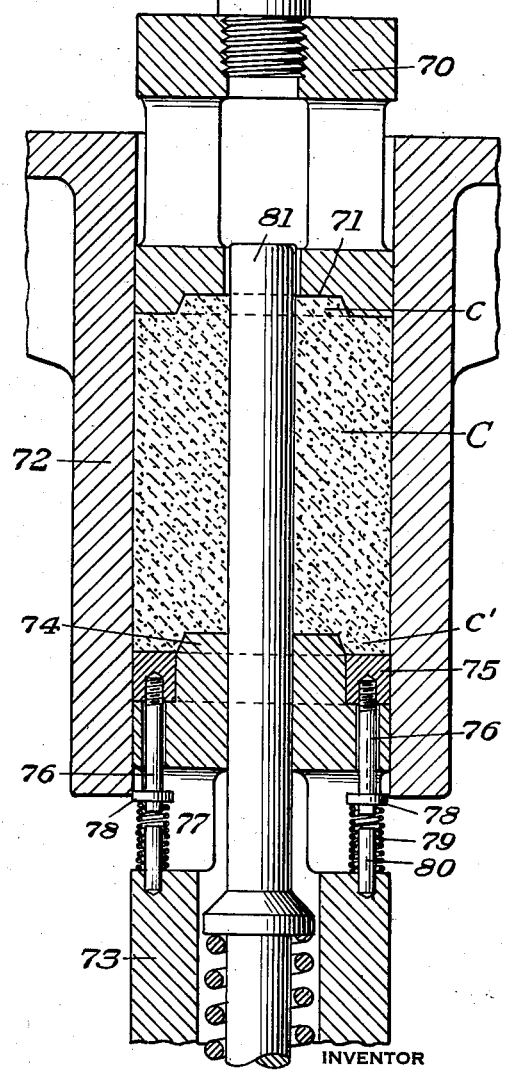
INVENTOR
Benjamin Lassman
by his attorneys Patented July 30, 1940

2,209,404

UNITED STATES PATENT OFFICE 2,209,404

APPARATUS FOR THE MANUFACTURE OF HOLLOW AND INDENTED DRY PRESSED CERAMIC WARE

Benjamin Lassman, Pittsburgh, Pa., assignor to Hydraulics, Inc., Pittsburgh, Pa., a corporation of Pennsylvania Application July 6, 1937, Serial No. 152,042

12 Claims. (Cl. 25—27)

This invention relates to the forming under pressure of hollow and indented masses of plastic, semi-plastic and granular materials. The invention has special application to the forming of bricks, blocks, tiles and the like, which are not of solid cross-section but which have a cavity in the nature of one or more holes or indentations therein, and to the forming of such articles from what is known as a dry mix, within a confining mold.

In numerous commercial applications it is desirable for one reason or another to use a building or refractory brick or other form having a cavity therein or therethrough. Ware of this nature at the present time is most commonly made from a clay mass known in the industry as "soft mud." This material is highly plastic because it contains a high percentage of water to produce plasticity, and is of a character which can be either extruded from the die under pressure or pierced in a mold. Ware of this character must be dried after it is formed before it is introduced into the kiln for burning. This necessitates the provision of drying equipment and the use of fuel to supply a drying heat, and additional handling along with the losses occurring through cracking and breaking incident to the drying and extra handling.

In recent years there has been a general recognition and acceptance of forming bricks and other shapes from granular mixes containing a very low moisture content, about 4% water by weight, this being known as "dry pressing." Dry pressing permits the article to be formed in the mold under pressure and then charged directly into the kiln without an intervening drying operation. This not only eliminates equipment and reduces losses, but results in a superior product. Dry mixes, however, by their very nature have little plasticity. Consequently, such mixes, from a practical standpoint, cannot be extruded or pierced in the manner in which soft mud mixes can.

Attempts have heretofore been made to dry-press hollow and indented ware by charging the dry mix into a mold in which is a mandrel or fixed core for forming the hole or indentation in the article. There are a number of objections to this method, however, there being limitations as to the depth to which the brick can be pressed and yet secure a uniform density and be free of defects caused by entrapped air in the mass. In my prior Patent No. 2,067,401, dated January 12, 1937, I have disclosed a method for the dry-pressing of materials according to which pressures much higher than those theretofore used could be successfully utilized in the dry-pressing of ware without obtaining pressure cracks and laminations due to air entrainment in the mix in the mold. Where pressures of the order contemplated in my above-mentioned prior patent are utilized for the forming of hollow and indented ware using a fixed mandrel or core within the mold, considerable difficulty has been encountered by reason of the fact that the mandrels are subject to very rapid abrasion and also to crushing forces tending to distort them, and a homogeneous structure of uniform density is not commercially obtained.

Considerable effort has been made toward the forming of hollow or indented ceramic articles by the dry-pressing method but for the reasons above pointed out they have not been commercially successful.

According to the present invention, I am able to commercially produce hollow or indented ceramic bricks and shapes by dry pressing, utilizing the method disclosed in my prior Patent No. 2,067,401, and this is accomplished by charging the material into a mold in which there is a mandrel for producing the indentation and core which is capable of moving in the direction of the applied pressure relatively to the mold and to the pressing plunger. By effecting movement of the mandrel relatively to the mold and the plunger, extremely high pressures can be utilized without crushing or bending the mandrel and a high degree of uniformity and density is obtained in the resulting product and the abrasion of the mandrel is very materially reduced.

The invention may be readily understood by reference to the accompanying drawings, in which Figure 1 represents a transverse vertical section through a typical form of mold embodying my invention;

Figure 2 is a view similar to Figure 1 showing the parts in the position which they occupy in the process of pressing;

Figure 3 is a fragmentary view showing a slightly modified form of mold and mandrel arrangement in the pressing apparatus for the production of articles in which the cavity does not extend entirely through the article, but is in the nature of a deep indentation;

Figure 4 is a detail view on a somewhat larger scale showing a vertical section through the mandrel in Figure 3;

Figure 5 is a perspective sectional view showing the type of article to be formed in the apparatus illustrated in Figure 3;

Figure 1:
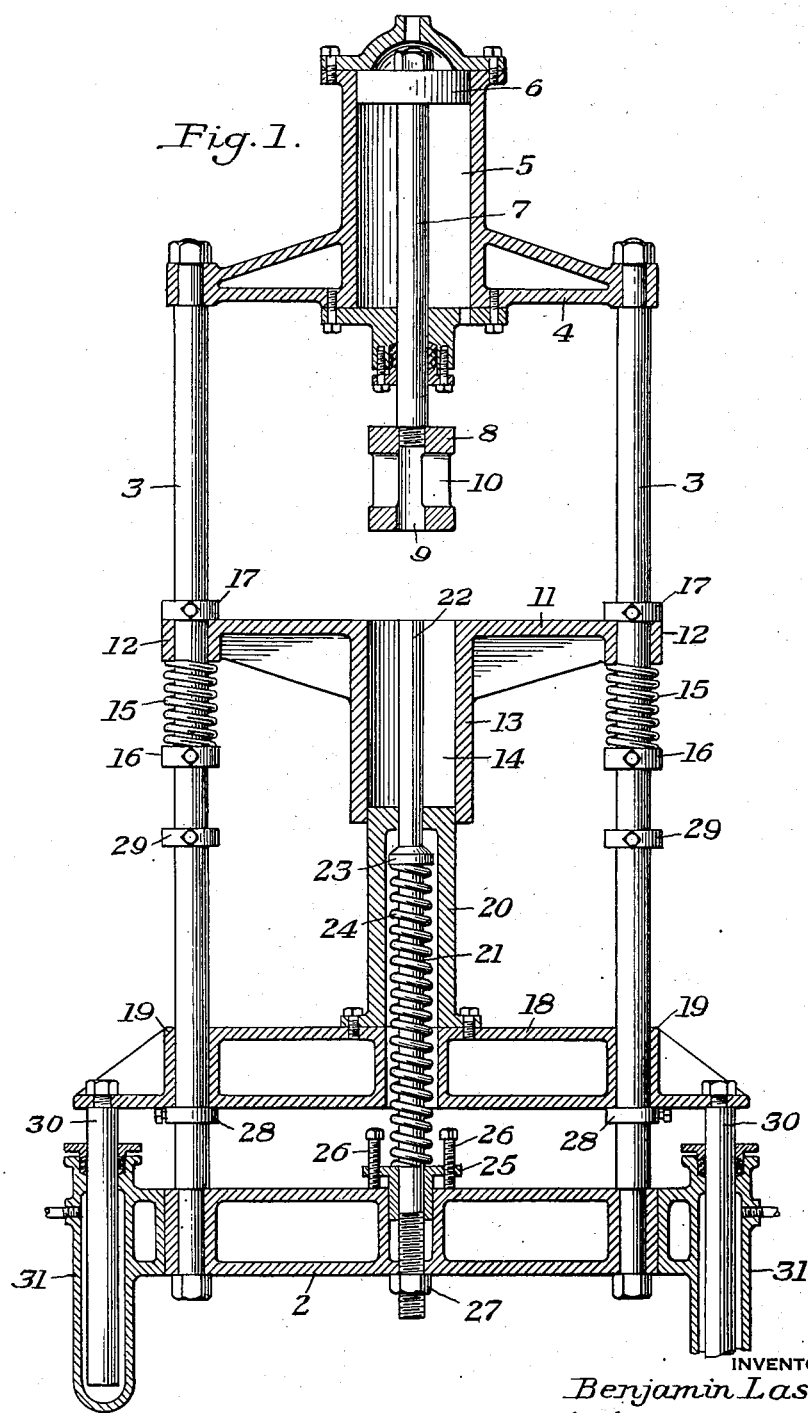

Figure 6 is a fragmentary view of another form of mold arrangement for the production of hollow articles having a projection at one end and an indentation at the other, by means of which said articles can be nested or interfitted in end-to-end relation, the mold parts being shown in the position which they occupy after the ejection of the completed article from the mold; and Figure 7 is a view similar to Figure 6, showing a mass of material pressed within the mold and illustrating one form of article adapted to be formed in a mold of this character.

Referring first to Figures 1 and 2 of the drawings, I have shown a press for the manufacture of a simple form of cylindrical article with a single cavity therein, this being for simplicity of illustration and not by way of limitation, it being obvious that the press may be modified to produce articles of other shapes and with a different number of cavities.

In the drawings, 2 designates a base member having parallel rods 3 thereon, at the top of which is an arbor 4 supporting a double acting hydraulic cylinder 5 within which is a piston 6 to which is attached a rod 7 on the lower end of which is a compacting plunger 8. The plunger 8 is made with a vertical opening 9 therein and it is provided with a transverse passage 10 which is not only for removing accumulated granulated material which may enter the opening 9 but which also serves as an observation port.

Slidable on the vertical rods 3 is a mold platen 11 having guides 12 for engagement with rods 3 and having a mold 13 therein in which is a mold cavity 14. The mold cavity, as above stated, is illustrated as being cylindrical but it may have any other appropriate shape. Under the guides 12 are springs 15 which are confined by adjustable collars 16 mounted on the columns or posts 3. These springs serve to lift the platen 11 to its normal position against adjustable stop collars 17, the springs 15 being so made as to allow enough free compression to permit the platen 11 to be forced down in the operation of molding such distance as may be required. The position of the stop collars 16 and 17 can be changed according to the design and capacity of the mold and to such other conditions as may require their adjustment.

Below the mold platen 11 and above the base member 2 is a bottom plunger supporting platen 18 having guides 19 therein by means of which the platen 18 is slidably mounted on the columns or posts 3. Mounted on the platen 18 is a vertical plunger 20, the upper end of which has a slidable close fit in the mold cavity 14. The plunger 20 is hollow and within it is a vertical rod 21, the upper end of which is slidably passed through the plunger 20 and projects into the mold cavity 14, forming a coring mandrel 22 within this cavity. The mandrel 22 has a diameter such that it will just snugly fit into the opening 9 in the compacting plunger 8 when the compacting plunger is brought down into operating position as hereinafter described. The rod 21 is provided with an abutment 23 inside the member 20 against which bears one end of a compression spring 24 that surrounds the rod 21. The other end of this spring rests against an adjustable support or bushing 25 carried on the base member 2 and which is adjustable through set screws 26. By adjustment of the set screws 26 the pressure of the spring 24 may be varied. The normal function of the spring 24 is to hold the mandrel and its supporting post up in the normal position as shown in Figure 1 and to permit it to yieldingly move downwardly in the molding operation, as will be hereinafter more fully described, the mandrel thereby being free floating. The lower end of the rod 21 is slidably guided in the bushing or support 25 and passes completely through the base member 2. It is threaded to its lowermost end and a nut 27 is provided on this threaded end. The function of the nut 27 is to permit the free downward movement of the rod 21 but to limit the extent to which the mandrel 22 can move upwardly under the influence of the spring 24. Ordinarily the adjustment of the nut 27 is such that the top of the mandrel 22 is flush with the top of the platen 11, as shown in Figure 1.

The platen 18 is limited in its downward movement by adjustable stop collars 28. The platen 18 may slide upwardly on columns 3, and another set of stop collars 29 limits the upward travel of the platen 18. Attached to the platen 18 are pistons 30 which cooperate with hydraulic cylinders 31 by means of which the platen 18 may be raised and lowered, the cylinders 31 being designed to operate as a unit for lifting the platen 18.

In the operation of molding, a "dry" ceramic mix is charged into the mold cavity 14 until the mold cavity is full. Fluid under pressure is then introduced into the top of the cylinder 5 forcing the plunger 8 down against the material in the mold. As the plunger 8 moves down the material in the mold is compacted and as the compacting of the material takes place motion is transmitted from the plunger through the material to the mold, causing the mold platen 11 to move or float down against the action of springs 15. The downward movement of the platen 11 with its mold causes the plunger 20 to press the material in the mold from the opposite surface so that the granular material is compacted from both ends of the mold in a manner well understood in the molding of ceramic articles. In the downward movement of the plunger 8 it telescopes over mandrel 22 in the manner illustrated in Figure 2. The compacting of the material in the mold also forces the material into frictional engagement with the mandrel 22. The mandrel 22, being supported to float independently of the plunger 20, may move down against the compression of the spring 24 entirely independently of the downward movement of the plunger 8 or the mold 14 and relatively to the plunger 20. This serves a number of purposes. It enables the material to be more densely and uniformly compacted around the mandrel, it relieves considerably the crushing force on the mandrel, and the mandrel being guided at both its upper and lower ends during the operation of pressing, is prevented from bending. Excessive abrasive wear of the mandrel is also avoided by reason of its being permitted to have this relative downward movement.

After the compacting of the material has been completed the piston 6 is operated in the reverse direction to withdraw the plunger 8. As the plunger 8 is withdrawn the platen 11 starts to move up to its normal position. At the proper time, the hydraulic jacks or cylinders 31 are operated to lift the platen 18 so that the plunger 20 moving upwardly through the mold cavity will aid in returning the platen 11 to its normal position if the springs have previously not operated to do so and will at the same time eject the molded shape from the mold cavity. When the top of the plunger 20 is flush with the top of the platen 11 the collars 29 will stop the further upward travel of the plunger 20 and the molded shape may then be slid from the top of the plunger onto the platen from whence it may be removed. After the removal of the molded mass the platen 18 is again dropped to its normal position and the cycle of molding is again repeated.

With a mold cavity and mandrel of the shape described the article will be as illustrated in Figure 2, comprising a cylindrical mass flat at each end and having a cavity or hole extending entirely therethrough from end to end. The cycle of pressing the material employed with this apparatus is preferably similar to that disclosed in my prior Patent No. 2,067,401, dated January 12, 1937, in which the dry granular mix is compacted to its approximate dimensions at a relatively high speed, after which the mold is opened to permit the escape of entrained air, after which the plunger re-enters the mold and the material is compacted to an extremely high density, pressure of the order of several thousands of pounds per square inch being employed. The operation of the mold between the interval of compacting and the operation of densifying to permit of the escape of entrained air, results in the production of an extremely dense and homogeneous article, substantially free of laminations and pressure cracks. Without allowing the mandrel to "float" independently of the plunger 20 and of the mold these high compacting pressures cannot be employed and uniform density in the walls of the article about the cavity cannot be obtained.

The invention is likewise applicable to the manufacture of articles in which the cavity is in the nature of a recess, particularly a deep recess, instead of constituting a hole passing clear through the article. Figures 3 and 4 illustrate apparatus for molding such an article, and Figure 5 illustrates a specimen article of this nature. In Figures 3 and 4 I have illustrated the invention applied to the manufacture of a simple cylindrical form having a single recess or cavity therein, but it will be understood that this is also for the purpose of illustration and that the shape of the article and the shape and number of recesses may be varied utilizing the same general principles of construction.

Referring first to Figure 5, the article designated A is in the form of a cylindrical block having flat ends and having a deep recess or cavity $a$ therein. The end wall of the cavity at the bottom of the recess at the point designated $b$ must be compacted to the same extent and be as dense as the material in the other parts of the article.

In Figure 3 I have not illustrated the complete press but have illustrated in detail certain parts of the press, the general construction of the press being similar to that previously described. In Figure 3, the numeral 35 designates the plunger corresponding to the compacting plunger 8 of Figure 1. The numeral 36 designates a mold platen corresponding to the mold platen 11 of Figures 1 and 2, and the mold is designated 37 with the mold cavity marked 38. The bottom plunger corresponding to the member 20 of Figures 1 and 2 is designated 39, and 40 is a platen corresponding to the platen 18 of Figures 1 and 2 and is arranged to be operated by fluid pressure jacks, not shown, in the same manner as described in connection with platen 18 in Figure 1. The bottom platen 41 corresponds to the member 2 of Figure 1. The mandrel for forming the cavity is designated 42 and 43 is the rod on which the mandrel is carried, while 44 is an abutment on this rod for engagement by a spring 45 corresponding to the spring 24 of Figure 1, the spring 45 bearing against an adjustable bushing 46 similar to the bushing 25 in Figure 1. The lower end of rod 43 projects below the bottom of the member 41 and is provided with a nut 47 to limit the upward movement of the mandrel. It will be observed in connection with Figure 3 that the nut 47 is adjusted in such manner that when the parts are in their normal position as shown in this figure, the top of the mandrel is considerably below the top of the platen 36, and it will also be noted that the plunger 35 in this case is solid since it does not have any telescopic engagement with the mandrel.

The mandrel 42 instead of being a solid mandrel as illustrated in Figures 1 and 2, has the construction shown in Figure 4 wherein there is a longitudinal passageway 48 therein in the uppermost end of which is a plug 49 which carries an upwardly opening check or poppet valve 50, the top of the mandrel, the top of the plug and the top of the check valve all normally being flush. The passage 48 extends down into the mandrel, passing beyond the abutment 44 and opens to the atmosphere through a radial opening 51.

Spaced below the end of the rod at 43 is a contact plunger 52 within a pressure cylinder 53. This cylinder communicates through a pipe 54 with a second cylinder 55 in which is a plunger 56 against which bears a compression spring 57. This spring in turn bears against an adjustable cross bar carried on rods 59, adjustment of the pressure of the spring 57 being effected by adjustment of nuts 60 on the posts 59. The cylinders 53 and 55 are filled with a fluid such as oil. The oil can be filled into the cylinders through a tank 61 and pipe connection 62 in which is an inwardly opening check valve 63. This valve permits the oil to flow into the cylinders but prevents its escape. An excess of oil can be kept in the tank 61 to replace any that might gradually be lost from the system.

In the operation of the mold the material is charged into the mold 37 and the plunger 35 is operated. In the initial stages of pressing, the coring mandrel 42 will move down a predetermined distance with relatively little resistance being offered its movement. However, when the lowermost end of the rod 45 hits the contact plunger 52 a retarding force against further downward movement will be exerted due to the noncompressible fluid in the cylinders 53 and 55. Any tendency of the plunger 52 to move downward is yieldably resisted by the spring 57 resisting upward movement of the plunger 55. The resistance offered to the plunger 42 to further downward movement will therefore be governed by the loading of the spring 57.

After the article has been formed, the press is operated in the manner described in connection with Figures 1 and 2 to eject the formed article. In order that the article will not be damaged by suction through its removal from the mandrel the poppet or check valve 50 is provided. This valve which is closed during the pressing operation, opens to admit air from the atmosphere as the formed article is lifted from the mandrel and the mandrel is withdrawn, thereby properly venting the interior of the article and preventing any undesirable vacuum being produced within the article. Through the utilization of an arrangement of this kind and with the proper setting of the coring mandrel below the top of the mold and the proper loading of the spring 57, I have been able to commercially produce indented ceramic articles, the density of which at the closed end thereof is equal to the density of any other section thereof and without injuring or deforming the floating mandrel. Frequently in the manufacture of articles of this character it is desirable to form one end of the article with an annular projection and the opposite end with a corresponding indentation so that a number of like articles may be arranged in end to end relation with the end of one interfitting or nesting into the end of the next adjacent one. This may be accomplished in the manner illustrated in Figure 6 in which the general construction of the mold and of the plungers and mandrel is similar to that illustrated and described in connection with Figure 1. In Figure 6 the compacting plunger corresponding to the plunger 8 in Figure 1 is designated 70. It is similar to the plunger 8 in all respects except that it is provided with an indentation 71 for forming an annular projection at one end of the completed article. The mold 72 is in all respects similar to the mold 13 of Figure 1 and the other parts of the organization are the same except for a slight modification of the upper portion of the bottom plunger.

In Figures 6 and 7 the bottom plunger, designated 73, corresponding to the plunger 20 of Figure 1, is provided with a reduced upper end portion 74 around which is a floating ring 75. There are dependent guide pins 76 on the ring 75 passing through the body of the plunger into a transverse passageway 77, these pins being provided with collars 78 to limit their upward movement and provide spring-engaging abutments. The pins are urged upwardly and the collar 75 is resiliently floated by compression springs 79, the lower ends of which are retained in place by retaining pins 80. Figure 6 shows the parts of the assembly in the position which they occupy at the time of the ejection of the finished form except that for the purpose of illustration the plunger 70 is in a position lower than it would normally be at the moment of ejection of the article from the mold, there being insufficient room on the sheet to show the plunger in the proper position. After ejection of the article from the mold, the first operation is to drop the bottom plunger 73 to the position formerly occupied adjacent the bottom of the mold 72. The material is then charged into the mold and is compacted by lowering the plunger 70 which in turn causes downward travel of the mold 72 while the plunger 73 remains stationary. As the material is compacted the floating ring or collar 75 is forced downwardly to the full limit of its movement. By reason of the shape of the plunger the resulting article will have the shape shown in Figure 7 in which the formed mass of granulated material is designated C. It is provided at its upper end with a projection c formed by reason of the recesses 71 in the plunger 70. It is formed at its lower end with a recess c'. The mandrel designated 81 is arranged to float as described in connection with Figure 1 and serves to form a cavity or hole entirely through the article. The floating ring 75 will be lifted by springs 79 in the operation of ejecting the formed article, lifting the formed article to a point where the recess in its lower end clears the top of the plunger, enabling the article to be slid off the plunger and mold platen.

In the present specification the word "cavity" is used as designating either a hole passing entirely through the formed article or an indentation, and "hollow article" means an article having a cavity of either type. In the present invention, the cavity is formed in the article and the article is made of uniform density by reason of the fact that the mandrel is a floating mandrel free to move relatively to the mold which also floats, and to the plungers. By reason of the same arrangement, the mandrel is protected against crushing or deforming and against excessive abrasion. In using the apparatus described, the method used in my prior patent before referred to is preferably used and the present invention enables the mandrel to properly function notwithstanding the extremely high pressures that are employed. Moreover, I have illustrated the invention as applied to a very simple form of hydraulic press, but this is merely for purposes of illustration, as any suitable press may be employed.

While I have illustrated and described certain specific embodiments of my invention, it is to be understood that this is in the way of illustration and that the invention is not limited to the particular arrangement herein shown and described and that it will be understood that various modifications are contemplated within the scope of my invention.

I claim:

1. A press for dry-forming granular or like material into hollow ware, comprising a free-floating mold, plungers cooperating therewith, a free-floating coring mandrel supported independently of the mold for movement relatively to the mold and to the plungers, and means independent of either plunger for limiting the range of floating movement of the coring mandrel in the direction of the mold.

2. A press for dry-forming hollow ware of granular or like material, comprising a floating mold having a mold cavity therein, plungers adapted to enter the mold cavity from opposite faces of the mold, a floating coring mandrel supported independently of the mold and independently of the plungers, the mold and the coring mandrel being arranged to be actuated in the pressing cycle entirely through friction with material which is charged into the mold cavity, means for resiliently supporting the coring mandrel, and means independent of the plungers for limiting the movement of the coring mandrel in the direction in which it is moved by said resilient supporting means.

3. A press for dry-forming hollow ware from granular or like material, comprising a floating mold having a mold cavity therein, means for adjusting the range of floating movement of the mold, plungers adapted to engage the mold cavity from opposite faces of the mold, the mold being supported independently of the plungers, a coring mandrel cooperating with the mold plungers and supported to float independently of the mold and of the plungers, and means for independently adjusting the range of free floating movement of the coring mandrel, the mold and the coring mandrel being arranged to be actuated in the pressing cycle entirely through friction with material which is charged into the mold cavity.

4. Apparatus for dry-pressing granular or like material to form hollow indented ware comprising a floating mold, plungers cooperating with the mold, the mold being supported entirely independently of either plunger, a free-floating coring mandrel for forming the indentation, and an adjustable support independent of the plungers for said free-floating mandrel through which the depth of the indentation may be varied.

5. Apparatus for the dry-pressing of granular or like material to form hollow ware, comprising a floating mold, plungers cooperating with the mold, the mold being supported entirely independently of either plunger, a coring mandrel cooperating with the plungers and mold and supported to float under the pressure of molding entirely independently of the plungers and mold, and an effectively adjustable fluid pressure mechanism cooperating with the mandrel for yieldably resisting the floating movement of said mandrel under the pressure of molding an article.

6. Apparatus for the dry-pressing of granular or like material to form hollow ware, comprising a floating mold, plungers cooperating with the mold, the mold being supported independently of both plungers, a coring mandrel cooperating with the plungers and mold and supported to float under the pressure of molding entirely independently of the plungers and mold, a fluid pressure mechanism supported independently of either of the plungers cooperating with the mandrel for yieldably resisting the floating movement of said mandrel under the pressure of molding an article, means for adjusting the range of movement of the coring mandrel to vary the depth of the indentation, and means for adjusting said fluid pressure means to vary the resistance against which the mandrel floats.

7. Apparatus for dry-pressing granular or like material to form an article having a cavity therein, comprising a floating mold, plungers cooperating with the mold, the mold being supported entirely independently of the plungers, a mandrel cooperating with the plungers and mold, said mold and mandrel being supported for independent relative floating movement, a fluid pressure unit for yieldably resisting floating movement of the mandrel, and means for adjusting said unit to vary the resistance.

8. A press for the forming of ceramic articles having a cavity therein, said press comprising a forming mold, a bottom plunger, the mold and bottom plunger being relatively movable, the mold being supported independently of the bottom plunger, a compacting plunger, the mold and compacting plunger being relatively movable throughout the entire operating range of movement, a mandrel projecting into the mold through one of said plungers and movable in the molding operation only under pressure of material in the mold relatively to the mold and both plungers, means independent of either plunger for limiting the movement of the mandrel in a direction upwardly with respect to the bottom plunger.

9. Apparatus for molding ware in which there is a cavity, comprising a press having a floating mold and opposed plungers, the mold being supported entirely independently of both plungers, and a mandrel in the mold movable under pressure of the material being compacted relatively to the mold and plungers.

10. Apparatus for the molding of ware with a cavity therein and having a recess in the ware in addition to such cavity, comprising a press having a mold yieldably supported for vertical movement, a bottom plunger member cooperating with the mold, an upper plunger member cooperating with the mold, a mandrel passing through one of the plunger members and yieldably supported for relative movement with respect to both of the plungers and the mold, and a yieldably supported member on the bottom plunger movable downwardly under the pressure of molding to effect the formation of the indentation of the article and movable upwardly upon release of the molding pressure to lift the bottom of the article so formed flush with the end of the bottom plunger to facilitate removal of the formed article.

11. Apparatus for the manufacture of ware from dry granular or like material comprising a press having a mold, a bottom plunger and a top plunger, the bottom plunger having a high portion to form an indentation in the article and a yieldably supported member thereon movable vertically from a position level with the high portion of the bottom plunger to a depressed position relatively thereto to enable a recess to be formed in the bottom of the article being molded, said member being movable downwardly under the pressure of molding, and being movable upwardly to a normal position flush with the top of the plunger in the operation of stripping the formed article from the mold.

12. Apparatus for the forming of articles from granular or like material into ware in which there is a cavity, comprising a press having a mold and means for compacting material within the mold, and a mandrel in the mold yieldably supported to float under pressure of material in the mold during the operation of molding, said mandrel serving to form the cavity in the ware, means independent of the plungers for limiting the range of movement of the mandrel in a direction toward the mold.

BENJAMIN LASSMAN.